United States Patent
Lee et al.

(10) Patent No.: US 11,086,538 B2
(45) Date of Patent: Aug. 10, 2021

(54) METHOD AND ELECTRONIC DEVICE FOR INITIALIZING STORAGE

(71) Applicant: Samsung Electronics Co., Ltd., Suwon-si (KR)

(72) Inventors: Woojoong Lee, Suwon-si (KR); Sungjong Seo, Suwon-si (KR); Junbeom Yeom, Suwon-si (KR); Yeongjin Gil, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 11 days.

(21) Appl. No.: 16/594,424

(22) Filed: Oct. 7, 2019

(65) Prior Publication Data
US 2020/0183589 A1    Jun. 11, 2020

(30) Foreign Application Priority Data

Dec. 5, 2018    (KR) .......................... 10-2018-0155055

(51) Int. Cl.
*G06F 3/06* (2006.01)
*G06F 8/61* (2018.01)

(52) U.S. Cl.
CPC .............. *G06F 3/064* (2013.01); *G06F 3/067* (2013.01); *G06F 3/0608* (2013.01); *G06F 3/0644* (2013.01); *G06F 8/63* (2013.01)

(58) Field of Classification Search
CPC ....... G06F 3/064; G06F 3/0608; G06F 3/0644
See application file for complete search history.

(56) References Cited

U.S. PATENT DOCUMENTS

| 5,675,769 | A | 10/1997 | Ruff et al. |
| 6,178,487 | B1 | 1/2001 | Ruff et al. |
| 8,756,396 | B1 | 6/2014 | Pruthi et al. |
| 9,141,400 | B2 | 9/2015 | Deal et al. |
| 9,710,165 | B1 | 7/2017 | Lherault et al. |
| 2011/0302360 | A1* | 12/2011 | Im .................. G06F 12/0246 711/103 |
| 2016/0117115 | A1* | 4/2016 | Mehra .................. G06F 3/0631 711/112 |
| 2016/0246713 | A1 | 8/2016 | Choi et al. |
| 2019/0102100 | A1* | 4/2019 | Vogan .................. G06F 3/0659 |

FOREIGN PATENT DOCUMENTS

KR  10-2011-0115871 A  10/2011
KR  10-2018-0045557 A  5/2018

OTHER PUBLICATIONS

International Search Report dated Dec. 24, 2019, Issued in International Application No. PCT/KR2019/011873.

* cited by examiner

*Primary Examiner* — Tracy A Warren
(74) *Attorney, Agent, or Firm* — Jefferson IP Law, LLP (57) ABSTRACT

A method for initializing a storage is provided. The method includes comparing a size of a disk partition of the storage with a size of a filesystem image recorded on the storage, and reconfiguring the filesystem image in a dynamic manner if the disk partition size is larger than that of the filesystem image, wherein the filesystem image may include a metadata area composed of metadata blocks and a data block area composed of file data blocks, and wherein the data block area may include in sequence a first free block area composed of only file data blocks where data is not recorded, and a file data area composed of at least one file data block where data is recorded. Various other embodiments are possible.

14 Claims, 10 Drawing Sheets

METHOD AND ELECTRONIC DEVICE FOR INITIALIZING STORAGE

CROSS-REFERENCE TO RELATED APPLICATION(S)

This application is based on and claims priority under 35 U.S.C. § 119(a) of a Korean patent application number 10-2018-0155055, filed on Dec. 5, 2018, in the Korean Intellectual Property Office, the disclosure of which is incorporated by reference herein in its entirety.

BACKGROUND

1. Field

The disclosure relates to a method and electronic device for initializing a storage.

2. Description of the Related Art

Various portable electronic devices including smartphones, tablet personal computers, portable multimedia players, personal digital assistants, laptop personal computers, and wearable devices such as wrist watches or head-mounted displays have been developed in recent years.

Such an electronic device may include a data storage. For example, it may include a main memory (e.g., random access memory (RAM)) and a storage serving as a mass storage medium.

In particular, the storage may use nonvolatile memory so that its contents are not erased even when the power is not applied. The nonvolatile memory may include at least one of, for example, a read only memory (ROM), an erasable programmable read only memory (EPROM), an electrically erasable programmable read only memory (EEPROM), a flash memory, or a ferroelectric random access memory (FRAM).

Electronic devices may include storages of various capacities according to user needs. For example, the manufacturer may manufacture electronic devices including a storage of 32 gigabytes (GB), 64 GB, or 128 GB.

In the case of mass production of electronic devices having storages of different capacities, the manufacturer may install a filesystem image of the storage with the smallest capacity (e.g., 32 GB) in all electronic devices through ROM writing. For example, the manufacturer may install the filesystem image configured for the storage of 32 GB in storages of 64 GB or 128 GB through ROM writing.

If a filesystem image of a different size than the actual partition size is ROM-written, the storage can dynamically reconfigure the file system at the time of initial boot. For example, the electronic device may resize the filesystem image to the actual partition size of the storage by reconfiguring the metadata of the file system.

The filesystem image may include a metadata block for identifying and managing the data, and a file data block to store actual data.

In general, the front portion of the filesystem image may be configured as a metadata area including metadata blocks, and the portion immediately after the metadata area may be configured as a file data area including file data blocks.

If a filesystem image smaller than the disk partition size is ROM-written to the storage, the filesystem image may be reconfigured to add a file data block corresponding to the disk partition size. In this case, a metadata block for identifying and managing the added file data block may also be added. As the metadata block is added, the metadata area may be expanded. In particular, the expanded metadata area may encroach on at least a portion of the file data area.

At least one file data block may be included in the file data area encroached upon by the metadata area. Thus, in some cases, metadata may be rewritten in a file data block where data is recorded.

To protect the file data block where data is recorded, the electronic device may back up the file data block or move it to another free block before expanding the metadata area. However, as the file data must be moved and/or backed up in advance, it is not only cumbersome but also inefficient.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and electronic device that can efficiently initialize a storage while preventing metadata from being rewritten in a file data block where data is recorded.

Another aspect of the disclosure is to provide a method and electronic device for initializing a storage wherein metadata can be recovered without ROM-writing even when the power is suddenly turned off in the process of reconfiguring the file system.

Additional aspects will be set forth in part in the description which follows and, in part, will be apparent from the description, or may be learned by practice of the presented embodiments.

In accordance with an aspect of the disclosure, a method for initializing a storage is provided. The method includes comparing a size of a disk partition of the storage with a size of a filesystem image recorded on the storage, and reconfiguring the filesystem image in a dynamic manner if the disk partition size is larger than that of the filesystem image, wherein the filesystem image may include a metadata area composed of metadata blocks and a data block area composed of file data blocks, and wherein the data block area may include in sequence a first free block area composed of only file data blocks where data is not recorded, and a file data area composed of at least one file data block where data is recorded.

In accordance with an aspect of the disclosure, an electronic device is provided. The electronic device includes a storage, and at least one processor functionally connected to the storage, wherein the at least one processor is configured to compare a size of a disk partition of the storage with a size of a filesystem image recorded on the storage, and reconfigure the filesystem image in a dynamic manner if the disk partition size is larger than that of the filesystem image, wherein the filesystem image may include a metadata area composed of metadata blocks and a data block area composed of file data blocks, and wherein the data block area may include in sequence a first free block area composed of only file data blocks where data is not recorded, and a file data area composed of at least one file data block where data is recorded.

In accordance with an aspect of the disclosure, an electronic device is provided. The electronic device includes a storage, and at least one processor functionally connected to the storage, wherein the at least one processor is configured to compare a size of a disk partition of the storage with a size of a filesystem image recorded on the storage, and reconfigure the filesystem image in a dynamic manner if the disk partition size is larger than that of the filesystem image, wherein the filesystem image may include a metadata area composed of metadata blocks, a reserved area composed of only file data blocks where data is not recorded, and a data block area composed of file data blocks, and wherein the data block area may include a file data area composed of at least one file data block where data is recorded.

In accordance with an aspect of the disclosure, the method and electronic device for initializing a storage can configure the file system of the storage in a rapid and efficient manner.

In accordance with an aspect of the disclosure, the method and electronic device for initializing a storage do not unnecessarily move or back up the file data block, reducing or preventing heat generation of the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
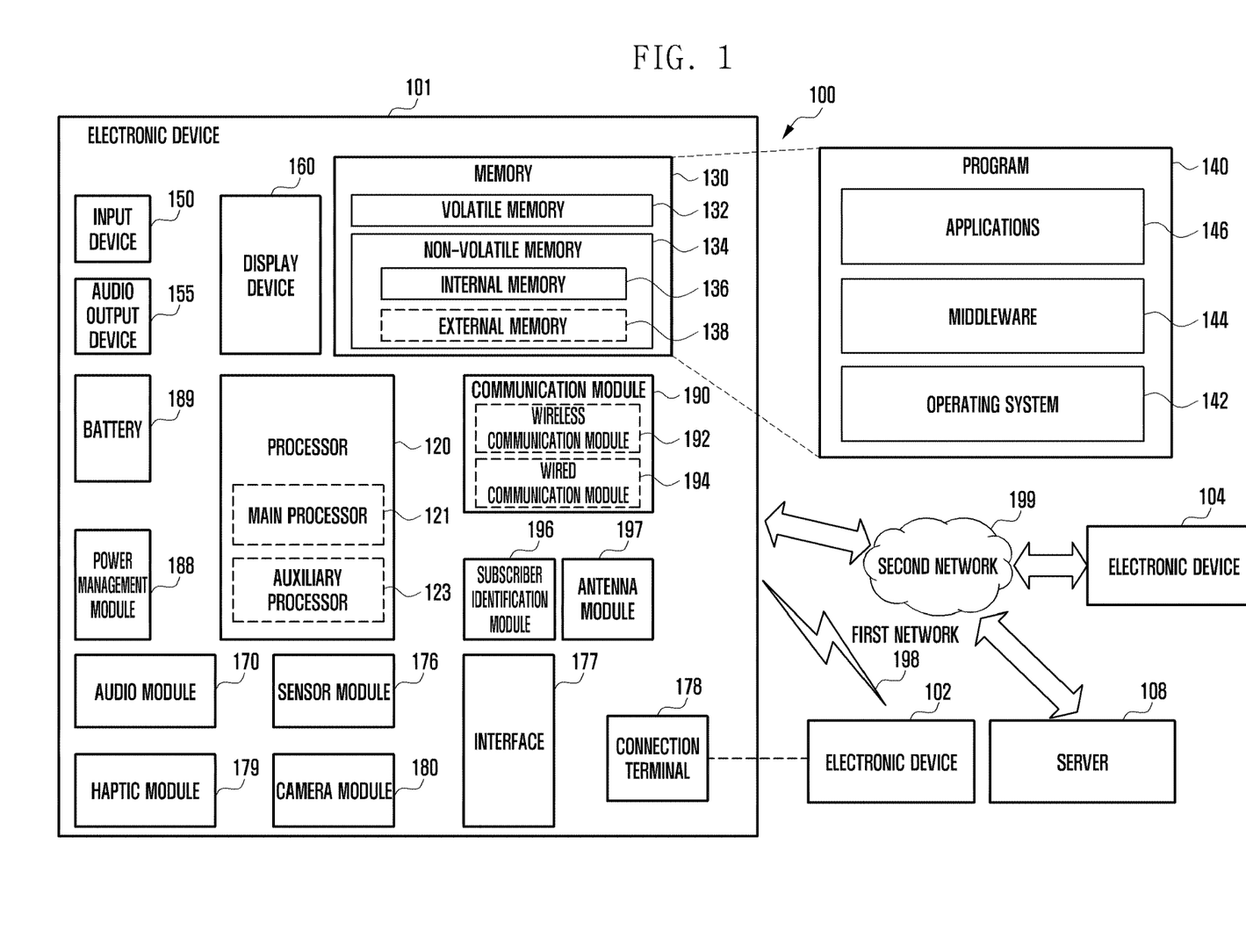
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134. Further, the non-volatile memory 134 may include an internal memory 136 or refer to an external memory 138.

The program 140 may be stored in the memory 130 as software, and may include, for example, an operating system (OS) 142, middleware 144, or an application 146. In one embodiment, the operating system 142 may include a filesystem reconfiguration module to dynamically reconfigure the file system. For example, the file system reconfiguration module may compare the size of the disk partition with the size of the filesystem image when the electronic device is booted, and may reconfigure the file system according to the size of the disk partition.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
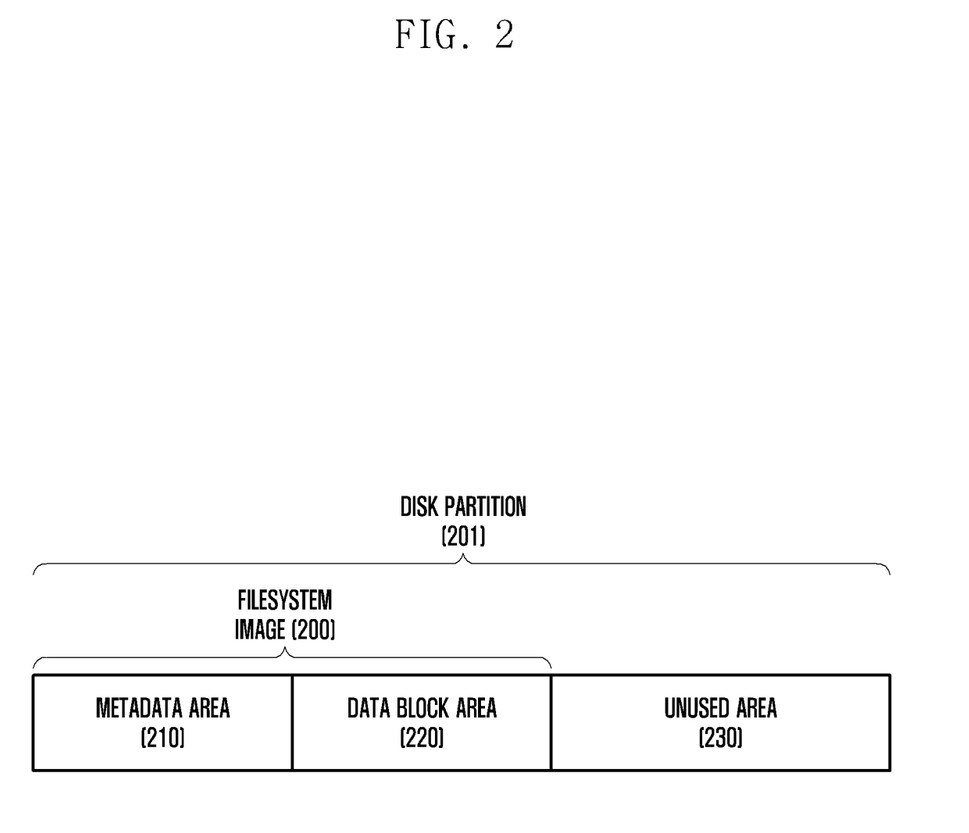
FIG. 2 illustrates a disk partition where a filesystem image is ROM-written according to an embodiment of the disclosure.

FIG. 2 illustrates a disk partition where a filesystem image is ROM-written according to an embodiment of the disclosure.

Referring to FIG. 2, a filesystem image 200 may be ROM written to the storage (e.g., nonvolatile memory 134 in FIG. 1) of the electronic device 101. The filesystem image 200 may include information for managing the logical structure of the entire disk (partition) and for managing all files recorded on the storage. For example, the filesystem image 200 may include a metadata block for identifying and managing data and a file data block for storing file data. The front portion of the filesystem image 200 may be configured as a metadata area 210 including metadata blocks, and the portion immediately after the metadata area 210 may be configured as a data block area 220 including file data blocks.

The filesystem image 200 being ROM-written to the storage may have a size smaller than the size of a disk partition 201. In this case, the disk partition 201 may include an unused area 230 where the file system is not recorded.

At the time of initial boot, the electronic device 101 may recognize the presence of the unused area 230 in the storage and may dynamically reconfigure the file system. For example, the electronic device 101 may add a metadata block for managing the unused area 230 to the file system. As the metadata block is added to the file system, the metadata area 210 may be expanded. The expanded metadata area 210 may encroach on a portion of the data block area 230. Hence, before expanding the metadata area 210, the electronic device may move at least some file data in the data block area 230 to a free block in the data block area 230.

Figure 3A:
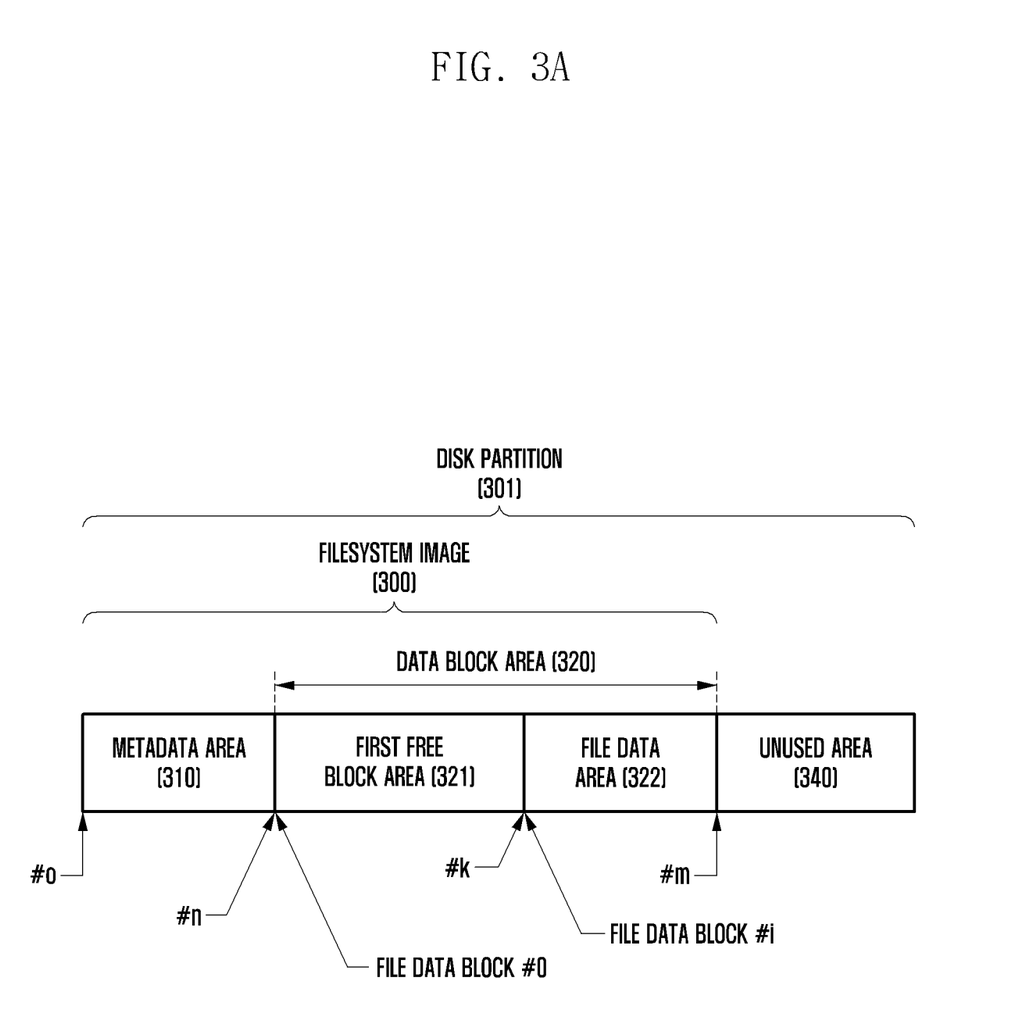
FIGS. 3A and 3B illustrate a method of initializing a storage according to various embodiments of the disclosure.
Figure 3B:
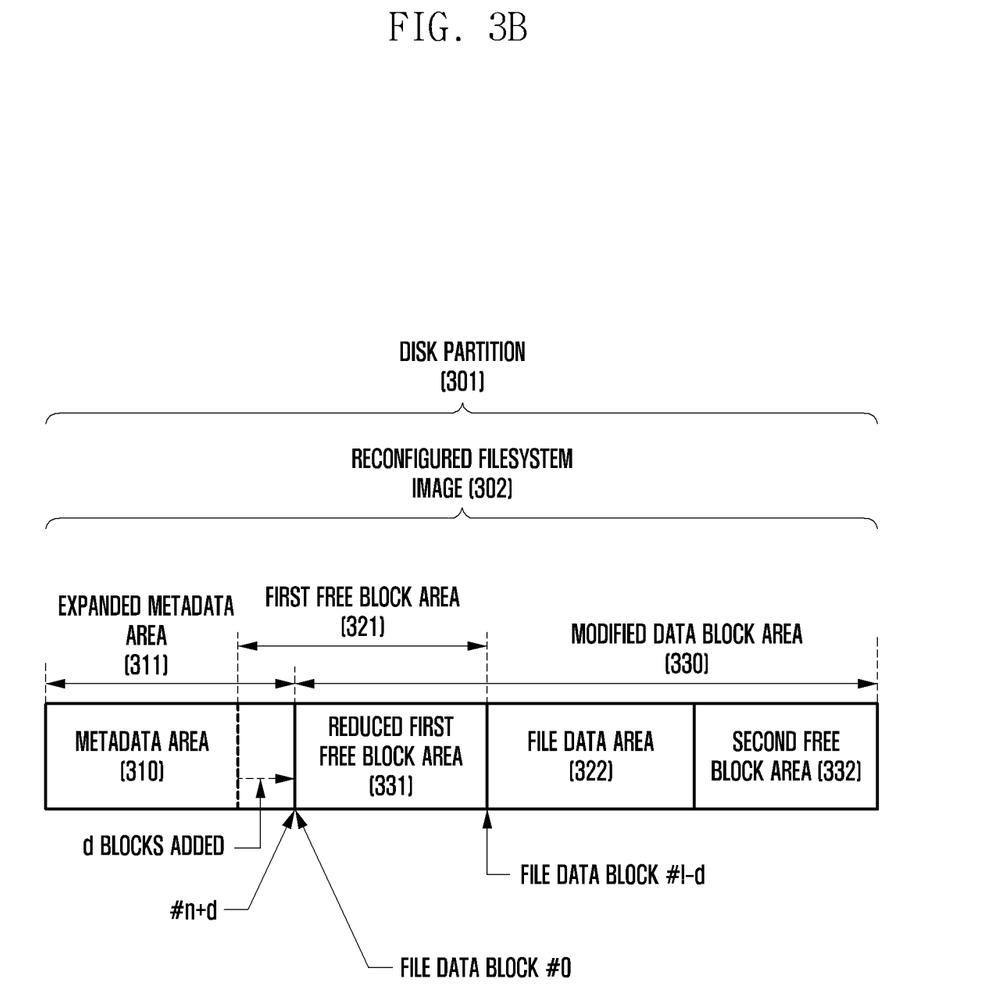

FIGS. 3A and 3B illustrate a method of initializing a storage according to various embodiments of the disclosure.

Referring to FIG. 3A, a filesystem image 300 may be ROM written to the storage (e.g., nonvolatile memory 134 in FIG. 1) of the electronic device 101. In various embodiments, the filesystem image 300 may be composed of disk blocks of a fixed size, and these disk blocks may be grouped for management into logical areas according to the usage purpose.

In various embodiments, the filesystem image 300 may be divided into a metadata area 310 including metadata blocks and a data block area 320 including file data blocks. In addition, the data block area 320 may include, for example, a first free block area 321 including file data blocks where data is not recorded (e.g., free blocks), and a file data area 322 including at least one file data block where data is recorded. In one embodiment, the filesystem image 300 may be configured to include the metadata area 310, the first free block area 321, and the file data area 322 in sequence. For example, the metadata area 310 may include blocks #0 to # n of the file system image 300, and the data block area 320 may include blocks # n+1 to # m of the filesystem image 300. The data block area 320 may be divided into the first free block area 321 including blocks # n+1 to # k and the file data area 322 including blocks # k+1 to # m.

In various embodiments, the electronic device 101 (e.g., filesystem reconfiguration module) may set and manage an offset for the data block area 320 using metadata. For example, the electronic device 101 may designate block # n+1 as a start offset of the data block area 320 (file data block #0). In this case, the start offset of the file data area 322 may be file data block # i.

When the filesystem image 300 being ROM-written to the storage has a size smaller than the size of the disk partition 301, the disk partition 301 may include an unused area 340 where the filesystem image is not recorded.

In various embodiments, the electronic device 101 (e.g., filesystem reconfiguration module) may check for the presence of the unused area 340 in the storage at the time of initial boot. As an example, the electronic device 101 may compare the size of the disk partition 301 with the size of the filesystem image 300. If the size of the disk partition 301 is larger than that of the filesystem image 300, the electronic device 101 may dynamically reconfigure the filesystem image. For example, the electronic device 101 may reconfigure the filesystem image by adding a metadata block to manage the unused area 340.

In various embodiments, the electronic device 101 (e.g., filesystem reconfiguration module) may add a metadata block by using at least some free blocks in the first free block area 321. For example, the added metadata block may be located immediately after the metadata area 310.

In various embodiments, the added metadata block together with the metadata area 310 may form an expanded metadata area. FIG. 3B illustrates a case where d metadata blocks are added. The d added metadata blocks together with the metadata area 310 may form an expanded metadata area 311. As a portion of the metadata is added to the first free block area 321, the first free block area 321 may be at least partially reduced to form a reduced first free block area 331.

In various embodiments, the electronic device 101 may generate a reconfigured filesystem image 302 by reconfiguring the filesystem image 300. The reconfigured filesystem image 302 may include, for example, the unused area 340 as a second free block area 332. For example, a modified data block area 330 may include the reduced first free block area 331, the file data area 322, and the second free block area 332. As the data block area 320 is modified, the offset for the modified data block area 330 may be reset. For example, the start offset of the data block area 320 set to block # n+1 may be moved by the number of added metadata blocks. In one embodiment, when d metadata blocks are added, the start offset set to block # n+1 for the data block area 320 may be moved to block # n+1+d for the modified data block area 330. As the start offset is changed, the start offset for the file data area 322 may be reset from file data block # i to file data block # i-d. By resetting the start offset, the modified data block area 330 includes the second free block area 332, and the expanded metadata area 311 may include a metadata block to manage the second free block area 332. In various embodiments, the electronic device 101 may store the offset indicating a file data block in the second free block area 332 by using at least some metadata in the expanded metadata area 311 to manage the file data.

Figure 4:
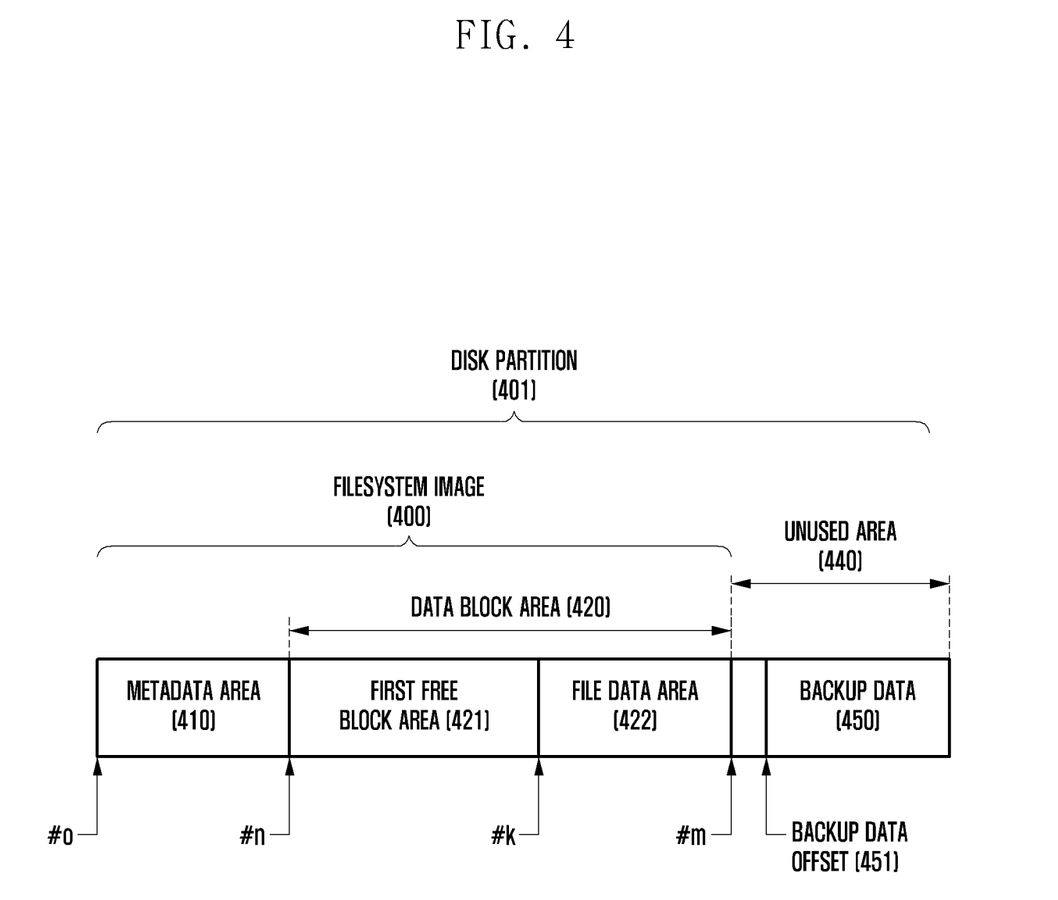
FIG. 4 illustrates a method of initializing a storage according to an embodiment of the disclosure.

FIG. 4 illustrates a method of initializing a storage according to various embodiments of the disclosure.

In an example, the power may be suddenly turned off while the file system is being reconfigured to initialize the storage. For example, the electronic device 101 may be turned off in response to a user command for forced termination. In this case, the filesystem image cannot be recovered, and ROM writing may be required again.

Referring to FIG. 4, a filesystem image 400 may be ROM written to the storage (e.g., nonvolatile memory 134 in FIG. 1). In various embodiments, the filesystem image 400 may be divided into a metadata area 410 including metadata blocks and a data block area 420 including file data blocks. In addition, the data block area 420 may include, for example, a first free block area 421 including free blocks, and a file data area 422 including at least one file data block where data is recorded. In one embodiment, the filesystem image 400 may be configured to include the metadata area 410, the first free block area 421, and the file data area 422 in sequence. For example, the filesystem image 400 may be composed of the metadata area 410 including blocks #0 to # n, and the data block area 420 including blocks # n+1 to # m. In more detail, the data block area 420 may be divided into the first free block area 421 including blocks # n+1 to # k and the file data area 422 including blocks # k+1 to # m.

When the filesystem image 400 being ROM-written to the storage has a size smaller than the size of the disk partition 401, the disk partition 401 may include an unused area 440 where the file system is not recorded.

In various embodiments, before reconfiguring (or resizing) the filesystem image 400, the electronic device 101 (e.g., filesystem reconfiguration module) may back up (copy and save) backup data 450 corresponding to the metadata of the metadata area in the unused area 440. In one embodiment, the backup data 450 corresponding to the metadata may be backed up in the first free block area 421. In this case, the backup data 450 may be located immediately before the file data area 422. However, the disclosure is not limited thereto, and the electronic device 101 may identify the number of metadata blocks to be added and record the backup data 450 after the file data area 422. In various embodiments, the electronic device 101 may set a backup data offset 451 corresponding to the backup data 450.

In various embodiments, after the metadata is backed up, the electronic device 101 may reconfigure the filesystem image 400. For example, the electronic device 101 may calculate the number of metadata blocks required to convert the unused area 440 into the second free block area (e.g., second free block area 332 in FIG. 3B), and form an expanded metadata area (e.g., expanded metadata area 311 in FIG. 3B). As the metadata area 410 is expanded, the offset for the data block area 420 may be reset. A process of reconfiguring the filesystem image 400 may be the same as or similar to the description of FIGS. 3A and 3B.

In various embodiments, the electronic device 101 (e.g., filesystem reconfiguration module) may delete the backup data 450 after reconfiguring the filesystem image 400. Then, the blocks used to record the backup data 450 may be used as free blocks.

Figure 5A:
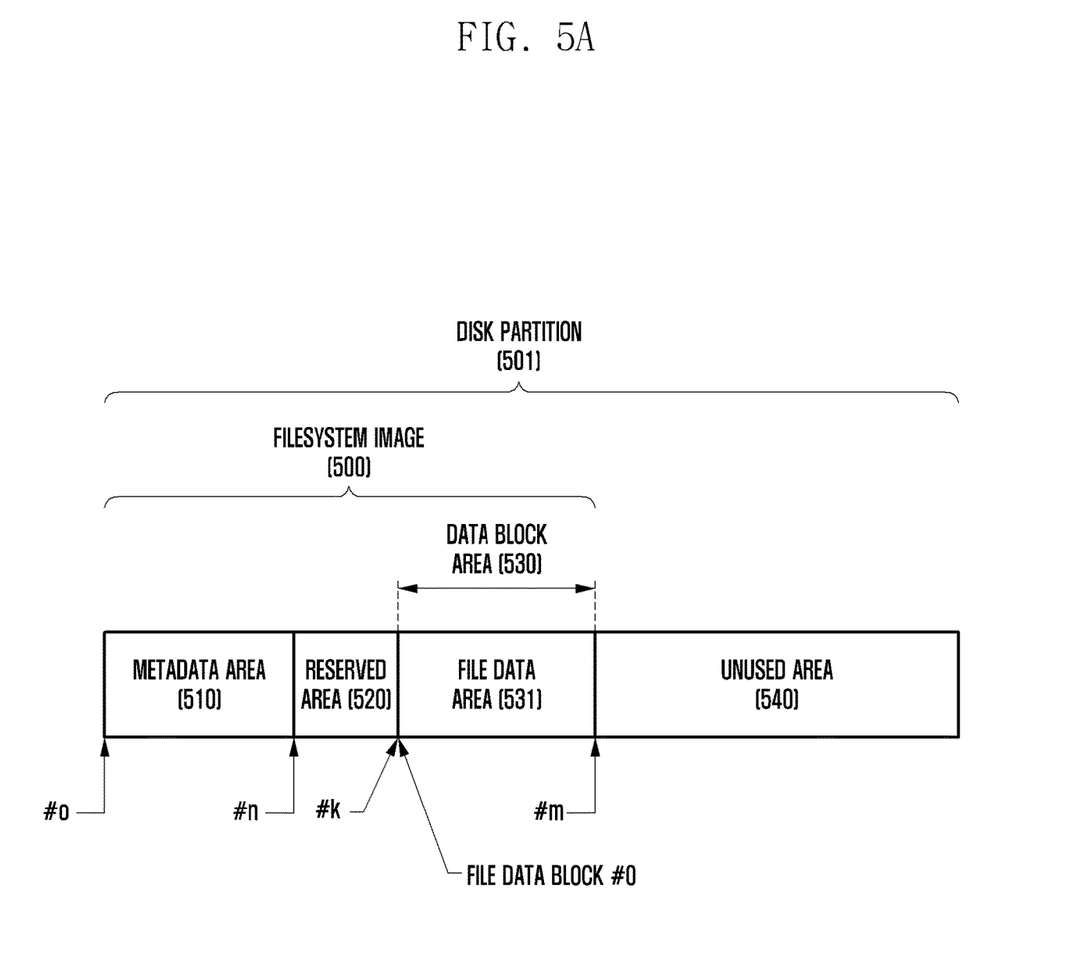
FIGS. 5A and 5B illustrate a method of initializing a storage according to various embodiments of the disclosure.
Figure 5B:
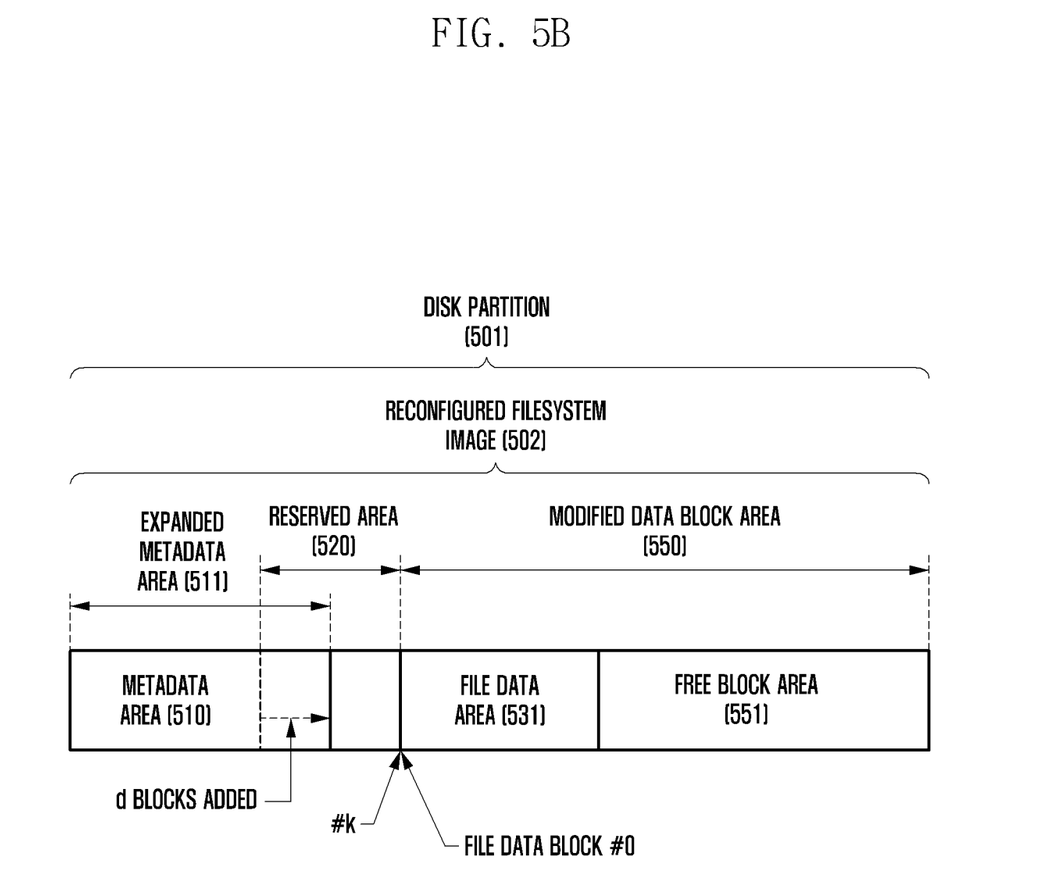

FIGS. 5A and 5B illustrate a method of initializing a storage according to various embodiments of the disclosure.

Referring to FIG. 5A, a filesystem image 500 may be ROM written to the storage (e.g., nonvolatile memory 134 in FIG. 1). In various embodiments, the filesystem image 500 may be divided into a metadata area 510 including metadata blocks, a reserved area 520 including free blocks, and a data block area 530. In addition, the data block area 530 may include, for example, a file data area 531 including at least one file data block where data is recorded. In one embodiment, the data block area 530 may coincide with the file data area 531. In one embodiment, the filesystem image 500 may be configured to include the metadata area 510, the reserved area 520, and the file data area 531 in sequence. For example, the filesystem image 500 may be composed of the metadata area 510 including blocks #0 to # n, the reserved area 520 including blocks # n+1 to # k, and the file data area 531 including blocks # k+1 to # m.

In various embodiments, the electronic device 101 (e.g., filesystem reconfiguration module) may set and manage an offset for the data block area 530 using metadata. For example, the electronic device 101 may designate block # k+1 as a start offset of the data block area 530 (file data block #0). In this case, the start offset of the file data area 531 may also be block # k+1.

When the filesystem image 500 being ROM-written to the storage has a size smaller than the size of the disk partition 501, the disk partition 501 may include an unused area 540 where the file system is not recorded.

In various embodiments, the electronic device 101 (e.g., filesystem reconfiguration module) may check for the presence of the unused area 540 in the storage at the time of initial boot. As an example, the electronic device 101 may compare the size of the disk partition 501 with the size of the filesystem image 500. If the size of the disk partition 501 is larger than that of the filesystem image 500, the electronic device 101 may dynamically reconfigure the filesystem image 500. For example, the electronic device 101 may reconfigure the filesystem image 500 by adding a metadata block to manage the unused area 540.

In various embodiments, the electronic device 101 (e.g., filesystem reconfiguration module) may add a metadata block by using at least some free blocks in the reserved area 520. FIG. 5B illustrates a case where d metadata blocks are added. The d added metadata blocks together with the metadata area 510 may form an expanded metadata area 511.

In various embodiments, the electronic device 101 may generate a reconfigured filesystem image 502 by reconfiguring the filesystem image 500. The reconfigured filesystem image 502 may include, for example, the unused area 540 as a free block area 551. For example, the modified data block area 550 may include the file data area 531 and the free block area 551. Although the filesystem image 500 is reconfigured so that the metadata area 510 is expanded, as the start offset of the data block area 530 and the start offset of the file data area 531 are the same, it may be unnecessary to reset the offset for the modified data block area 550. For example, the start offset of the modified data block area 550 may indicate block # k+1. In one embodiment, as the unused area 540 is used as the free block area, an offset for managing the free block area may be added. For example, the electronic device 101 may store the offset indicating a file data block in the free block area 551 by using at least some metadata in the expanded metadata area 511 to manage the file data.

Figure 6:
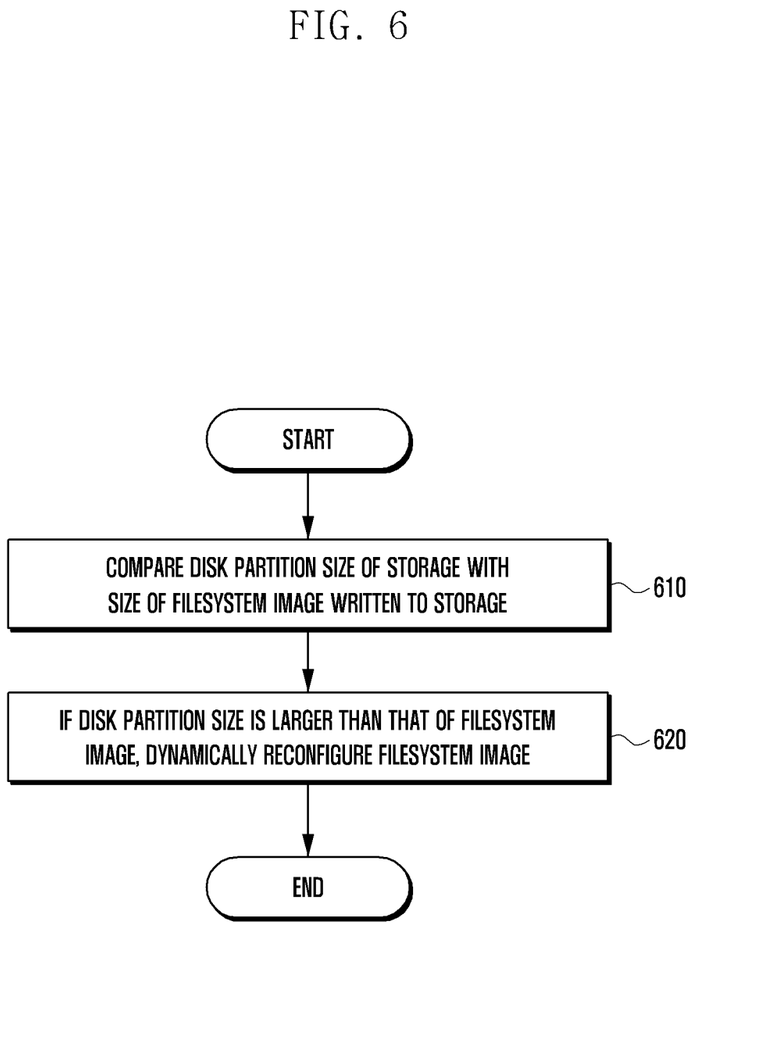
FIG. 6 is flowchart depicting a method of initializing a storage according to an embodiment of the disclosure.

FIG. 6 is flowchart depicting a method of initializing a storage according to various embodiments of the disclosure.

Referring to FIG. 6, at operation 610, the processor 120 of the electronic device 101 (e.g., filesystem reconfiguration module) may compare a size of a disk partition of a storage (e.g., nonvolatile memory 134 in FIG. 1) with a size of a filesystem image written to the storage. For example, the filesystem image being ROM-written to the storage may include, in sequence, a metadata area including metadata blocks, a first free block area including only file data blocks where data is not recorded, and a file data area including at least one file data block where data is recorded.

In various embodiments, the electronic device 101 may check for the presence of an unused area in the storage at the time of initial boot. In an example, the electronic device 101 may compare the size of the disk partition with the size of the filesystem image.

In various embodiments, if the size of the disk partition is larger than that of the filesystem image, at operation 620, the processor 120 of the electronic device 101 (e.g., filesystem reconfiguration module) may dynamically reconfigure the filesystem image.

In various embodiments, the processor 120 of the electronic device 101 may identify an unused area where the file system image is not recorded in the disk partition. For instance, when the file system image being ROM-written to the storage has a size smaller than the disk partition size, the disk partition may include an unused area where the file system image is not recorded.

In various embodiments, the processor 120 of the electronic device 101 may store the metadata recorded in the metadata area as backup data (e.g., backup data 450) in the unused area.

Figure 7:
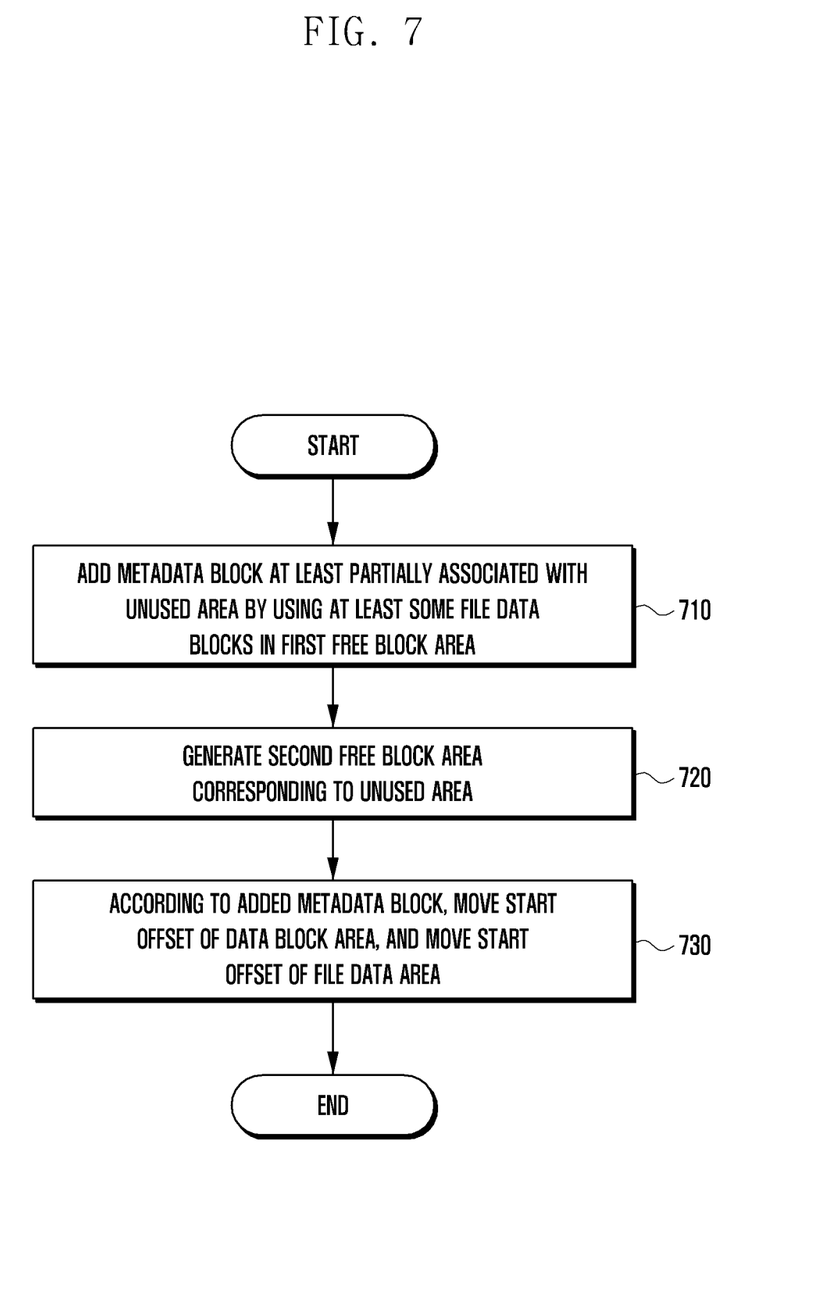
FIG. 7 is a flowchart depicting a method of dynamically reconfiguring a filesystem image according to an embodiment of the disclosure.

FIG. 7 is a flowchart depicting a method of dynamically reconfiguring a filesystem image according to various embodiments of the disclosure.

In various embodiments, the filesystem image (e.g., filesystem image 300) may be divided into a metadata area (e.g., metadata area 310) including metadata blocks and a data block area (e.g., data block area 320) including file data blocks. In addition, the data block area may include, for example, a first free block area (first free block area 321) including file data blocks where data is not recorded (or, free blocks) only, and a file data area (e.g., file data area 322) including at least one file data block where data is recorded.

Referring to FIG. 7, at operation 710, the processor 120 of the electronic device 101 (e.g., filesystem reconfiguration module) may add a metadata block at least partially associated with the unused area by using at least some file data blocks in the first free block area. In one embodiment, the added metadata block may be located immediately after the metadata area.

At operation 720, the processor 120 of the electronic device 101 (e.g., filesystem reconfiguration module) may generate a second free block area corresponding to the unused area. The generated second free block area may be included as a part of the data block area. For example, the modified data block area (e.g., modified data block area 330) may include a reduced first free block area (e.g., reduced first free block area 331), a file data area 322, and a second free block area (e.g., second free block area 332).

At operation 730, the processor 120 of the electronic device 101 (e.g., filesystem reconfiguration module) may move the start offset of the data block area according to the added metadata block, and may also move the start offset of the file data area according to the moved start offset of the data block area. For instance, as the data block area is modified, the offset of the modified data block area may be reset. In addition, the processor 120 of the electronic device 101 may set an offset for managing file data blocks in the second free block area 332.

In various embodiments, the processor 120 of the electronic device 101 may delete the backup data (e.g., backup data 450) recorded in the unused area after the reconfiguration operation.

Figure 8:
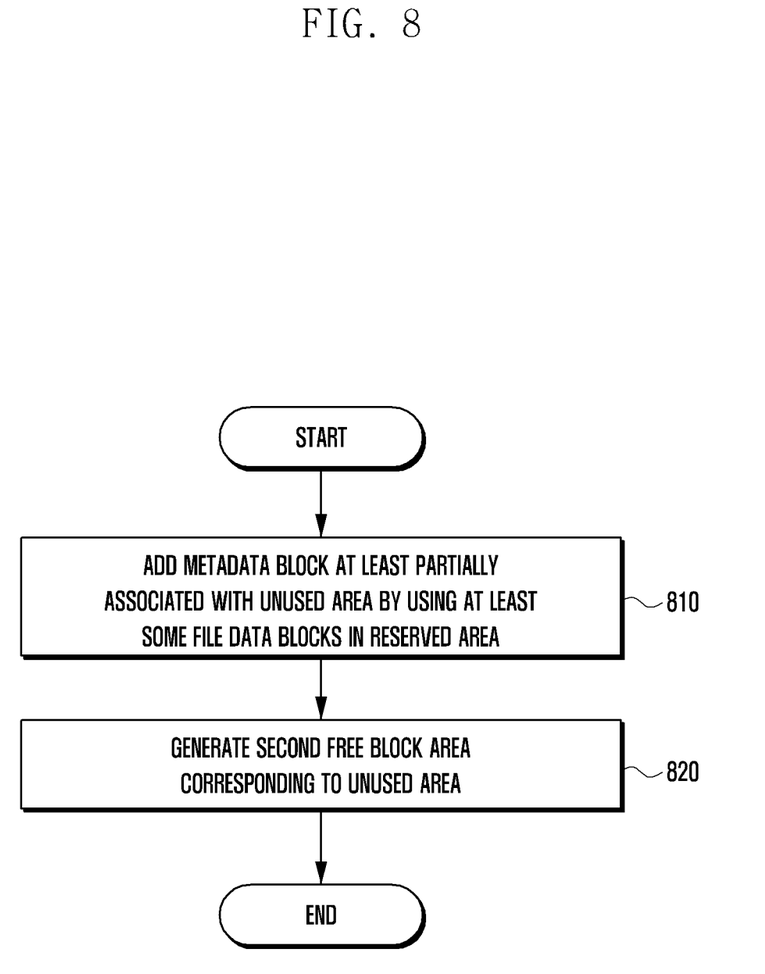
FIG. 8 is a flowchart depicting a method of dynamically reconfiguring a filesystem image according to an embodiment of the disclosure.

FIG. 8 is a flowchart depicting a method of dynamically reconfiguring a filesystem image according to various embodiments of the disclosure.

In various embodiments, the filesystem image (e.g., filesystem image 500) may be divided into a metadata area (e.g., metadata area 510) including metadata blocks, a reserved area (e.g., reserved area 520) including free blocks, and a data block area (e.g., data block area 530). In addition, the data block area may include, for example, a file data area (e.g., file data area 531) including at least one file data block where data is recorded.

Referring to FIG. 8, at operation 810, the processor 120 of the electronic device 101 (e.g., filesystem reconfiguration module) may add a metadata block at least partially associated with the unused area by using at least some file data blocks in the reserved area. In one embodiment, the added metadata block may be located immediately after the metadata area.

At operation 820, the processor 120 of the electronic device 101 (e.g., filesystem reconfiguration module) may generate a second free block area corresponding to the unused area. The generated second free block area may be included as a part of the data block area. For example, the modified data block area (e.g., modified data block area 550) may include a file data area 531 and a free block area (e.g., free block area 551).

In various embodiments, the processor 120 of the electronic device 101 may delete the backup data (e.g., backup data 450) recorded in the unused area after the reconfiguration operation.

An electronic device according to various embodiments may be one of various types of electronic devices. An electronic device may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. A method for initializing a storage, the method comprising:
   comparing a size of a disk partition of the storage with a size of a filesystem image recorded on the storage; and
   reconfiguring the filesystem image in a dynamic manner in response to the size of the disk partition being larger than the size of the filesystem image,
   wherein the filesystem image includes a metadata area composed of metadata blocks and a data block area composed of file data blocks,
   wherein the data block area includes in sequence a first free block area composed of only file data blocks where data is not recorded, and a file data area composed of at least one file data block where data is recorded, and
   wherein the reconfiguring of the filesystem image comprises:
      identifying an unused area where the filesystem image is not recorded in the disk partition, and
      adding a metadata block associated with the unused area by using at least some file data blocks in the first free block area.

2. The method of claim 1, wherein the added metadata block is located immediately after the metadata area.

3. The method of claim 1, further comprising generating a second free block area corresponding to the unused area, wherein the generated second free block area is included in the data block area as a part thereof.

4. The method of claim 1, further comprising:
moving a start offset of the data block area according to the added metadata block; and
moving a start offset of the file data area according to the moving of the start offset of the data block area.

5. The method of claim 1, further comprising storing metadata recorded in the metadata area as backup data in the unused area.

6. The method of claim 5, further comprising deleting the backup data stored in the unused area after the reconfiguring of the filesystem image.

7. An electronic device comprising:
a storage; and
at least one processor functionally connected to the storage,
wherein the at least one processor is configured to:
compare a size of a disk partition of the storage with a size of a filesystem image recorded on the storage, and
reconfigure the filesystem image in a dynamic manner in response to the size of the disk partition being larger than the size of the filesystem image,
wherein the filesystem image includes a metadata area composed of metadata blocks and a data block area composed of file data blocks,
wherein the data block area includes in sequence a first free block area composed of only file data blocks where data is not recorded, and a file data area composed of at least one file data block where data is recorded, and
wherein the at least one processor is further configured to:
identify an unused area where the filesystem image is not recorded in the disk partition, and
add a metadata block associated with the unused area by using at least some file data blocks in the first free block area.

8. The electronic device of claim 7, wherein the added metadata block is located immediately after the metadata area.

9. The electronic device of claim 7,
wherein the at least one processor is further configured to generate a second free block area corresponding to the unused area, and
wherein the generated second free block area is included in the data block area as a part thereof.

10. The electronic device of claimer 7, wherein the at least one processor is further configured to:
move a start offset of file data blocks according to the added metadata block, and
store a start offset of the file data area changed according to the moving of the start offset of the file data blocks.

11. The electronic device of claim 7, wherein the at least one processor is further configured to store metadata recorded in the metadata area as backup data in the unused area.

12. The electronic device of claim 11, wherein the at least one processor is further configured to delete the backup data stored in the unused area after reconfiguring the filesystem image.

13. An electronic device comprising:
a storage; and
at least one processor functionally connected to the storage,
wherein the at least one processor is configured to:
compare a size of a disk partition of the storage with a size of a filesystem image recorded on the storage, and
reconfigure the filesystem image in a dynamic manner in response to the size of the disk partition being larger than the size of the filesystem image,
wherein the filesystem image includes a metadata area composed of metadata blocks, a reserved area composed of only file data blocks where data is not recorded, and a data block area composed of file data blocks,
wherein the data block area includes a file data area composed of at least one file data block where data is recorded, and
wherein the at least one is further configured to:
identify an unused area where the filesystem image is not recorded in the disk partition, and
add a metadata block associated with the unused area by using at least some file data blocks in the reserved area.

14. The electronic device of claim 13,
wherein the at least one processor is further configured to generate a second free block area corresponding to the unused area, and
wherein the generated second free block area is included in the data block area as a part thereof.

* * * * *